Dec. 2, 1952     L. C. RUBIN ET AL     2,620,346
SYNTHESIS OF ORGANIC COMPOUNDS
Filed Sept. 24, 1948
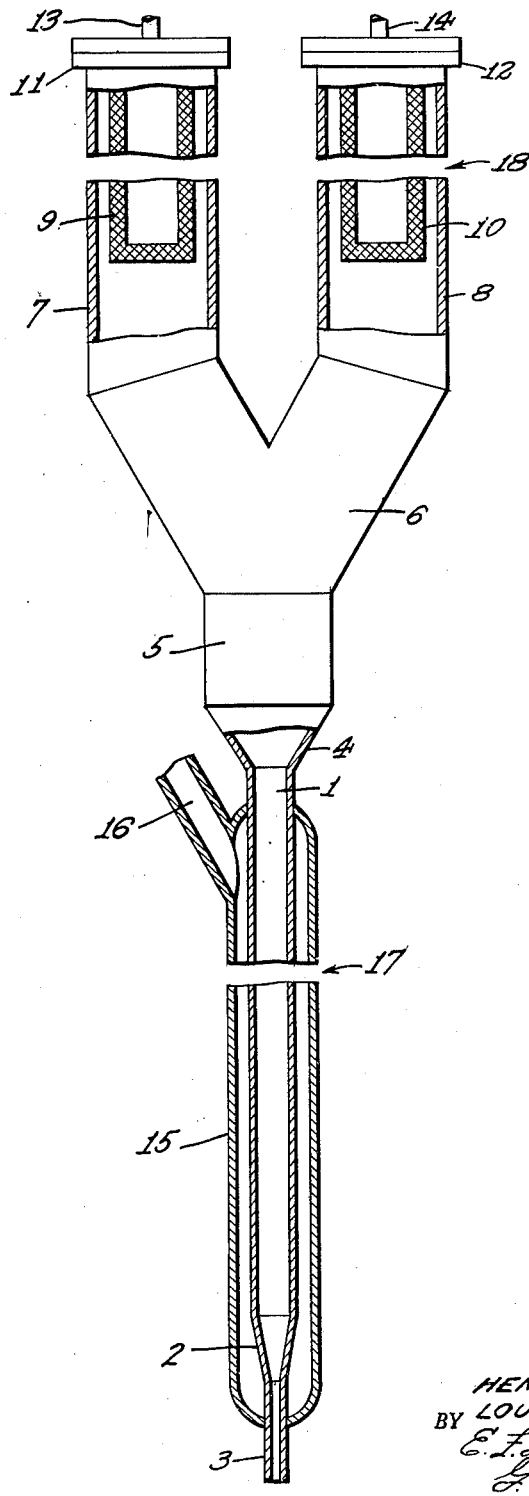
INVENTORS
HENRY G. McGRATH
BY LOUIS C. RUBIN
E. F. Liebrecht
G. H. Palmer
ATTORNEYS Patented Dec. 2, 1952

2,620,346

UNITED STATES PATENT OFFICE 2,620,346

SYNTHESIS OF ORGANIC COMPOUNDS

Louis C. Rubin, West Caldwell, and Henry G. McGrath, Elizabeth, N. J., assignors to The M. W. Kellogg Company, Jersey City, N. J., a corporation of Delaware Application September 24, 1948, Serial No. 50,966

6 Claims. (Cl. 260—449.6)

This invention relates to an improved method for reacting hydrogen and carbon monoxide to produce normally liquid hydrocarbons. More particularly, this invention relates to an improved method for hydrogenating carbon monoxide to produce liquid hydrocarbons in the presence of a metallic hydrogenation catalyst of the type exemplified by nickel, cobalt and ruthenium. Still more particularly, the invention relates to an improved method for reacting hydrogen and carbon monoxide to produce a liquid hydrocarbon product which is highly saturated and a desirable ingredient of diesel fuel under conditions productive of very small amounts of wax.

The object of this invention is to provide a new and improved process for the synthesis of organic compounds from hydrogen and carbon monoxide without excessive formation of waxes and relatively heavy organic compounds.

Another object of this invention is to provide a satisfactory starting-up procedure in a synthesis process using finely-divided catalyst in a suspended condition.

Still another object is to provide a method for heating up the reaction system in the hydrogenation of carbon monoxide without excessive formation of waxes.

This application is a continuation-in-part of our prior application Serial No. 550,800, filed August 23, 1944.

In accordance with this invention, the gas mixture, comprising hydrogen and carbon monoxide in suitable proportions, is passed upwardly in a reaction zone through a mass of finely-divided contact material comprising a freshly reduced metal hydrogenating catalyst. For the purposes of this description and the following claims, a "freshly reduced metal hydrogenating catalyst" may be defined as a catalytic metal which has been formed by reduction of a metal oxide and which has not been used under conditions which build up waxy deposits on the surface thereof, or one which has been revivified by hydrogen treatment to restore it substantially to its original fresh condition. Such metal hydrogenating catalysts include those having hydrogenating characteristics similar to those of cobalt or nickel. A preferred group of such catalysts comprises the metals of the VIIIth group of the periodic system having atomic numbers higher than 26. Within this group the preferred metals are cobalt, nickel and ruthenium.

The metal hydrogenating catalyst may be employed in the metallic form with or without a support and may or may not be associated with promoters, such as magnesia, thoria, alumina, silica, titania, manganese oxide, etc. Ordinarily, the metal catalysts are associated with suitable supports, such as kieselguhr and clay, in the ratio of one part by weight of the metal catalyst to two parts by weight of the support. Preferably also promoters such as the metal oxides listed above are incorporated in small proportions. The catalyst may be combined with the supporting material and promoters in any suitable manner, and the final product is then converted to a state of fine sub-division. Preferably the powdered catalyst employed in the improved process consists principally of a mixture of particles varying in size from 40 to 400 microns (average diameter). However, particles of larger or smaller diameter may be present.

The gaseous mixture is passed upwardly through the mass of powdered contact material at a velocity effective to suspend the mass in the gas stream. The gas stream is passed through the reaction zone at a velocity sufficiently low to maintain the contact mass in a dense, fluidized, pseudo-liquid condition. In this condition the contact mass may be said to be suspended in the gas stream, but not entrained therein in the sense that there is movement of the contact mass as such in the direction of flow of the gas stream. It is preferred to flow the gas stream through the mass at a velocity sufficiently high to maintain the fluidized contact mass in a highly turbulent condition in which the particles of contact material circulate at a high rate in the pseudo-liquid mass. In this preferred condition of operation a small proportion of contact material in the fluidized mass may become entrained in the gas stream emerging from the upper surface of the mass whereby it is carried away from the mass.

The gas mixture is introduced into the reactor, in which the contact mass is located, through an inlet in the bottom thereof whereby the gas stream passes upwardly through the contact mass to be maintained in a fluidized condition. The cross-sectional area of the inlet is substantially less than the corresponding dimension of the space in the chamber occupied by the contact mass. In that manner the gas stream may be passed into the reactor through the inlet at a high velocity whereby solids do not pass downwardly out of the reactor through the gas inlet. For convenience, the velocity of the gas stream in the chamber or reactor is given in terms of the theoretical velocity of the gas stream through an empty chamber, referred to hereafter as the superficial velocity.

If the reactor is somewhat larger in volume than the space to be occupied by the fluidized mass of contact material, the contact mass appears to be distributed in the reactor in two visually distinct phases. One phase is the relatively dense pseudo-liquid mass of contact material described above. This phase occupies the lower portion of the reactor and comprises all but a minor proportion of the contact material in the reactor. The second phase, which occupies the upper part of the reactor, is a diffuse phase in which the concentration of the contact material is far less and of a different order of magnitude than the average concentration in the dense phase. The diffuse phase is a disengaging zone in which the solids lifted above the dense phase by the gas stream are disengaged therefrom, to the extent that such solids are present in excess of the carrying capacity of the gas stream at the minimum velocity reached by the gas stream in the reactor. Between the dense phase and the diffuse phase there is a relatively narrow zone in which the concentration of solids per unit of reactor volume changes in a short space from the high concentration of the dense phase to the low concentration of the diffuse phase. This zone has the appearance of an interface between two visually distinct phases.

The improved method may be operated with contact material of relatively large particle size and under conditions such that substantially no part of the contact material is carried by entrainment in the gas stream at the superficial velocity. However, the preferred method of operation involves the use of contact material of the particle size indicated above and operating conditions such that a portion of the contact material is carried by entrainment in the gas stream at the superficial velocity. The finely-divided contact materials are desirable as presenting a high ratio of surface to volume and as affording the maximum efficiency of heat transfer between particles. Relatively high gas velocities are found to be desirable in efficiently mixing the components of a contact mass of substantial cross-sectional area. In this preferred method of operation mere settling is not sufficient to disengage all the contact material from the gas stream emerging from the dense phase. It is necessary, therefore, to provide means in cooperation with the reactor to separate entrained solids from the gas stream. Solids thus separated are returned to the reactor or are replaced with fresh material.

The gas stream is withdrawn from the top of the reactor through an exit which is ordinarily substantially smaller in cross-sectional area than the reactor. This provides a high velocity outlet for the gases which is surrounded by an area in the reactor in which the gas velocity accelerates. The nearer this zone of accelerating gas velocity is to the dense phase the greater is the concentration of solids in the gas stream entering that zone and the greater is the quantity of solids carried out of the reactor in the exit stream. This quantity approaches the carrying capacity of the high velocity exit gas stream when it is desired to maintain the upper level of the dense phase in the vicinity of the zone of accelerating velocity. It is preferred, however, to provide a reactor substantially larger than the required volume of those fluidized contact materials whereby there is a relatively large diffuse phase in which substantial disengagement of solids from the gas stream occurs by mere settling.

The quantity of contact material required in the reactor may be charged to the latter prior to the passage of a gas stream therethrough. Alternatively, the highly turbulent dense pseudo-liquid phase may be established by flowing a gas stream through the empty reactor and charging finely-divided contact material into the reactor at a rate greater than the carrying capacity of the gas stream at its superficial velocity. As a result of such excess loading, the desired volume of dense phase is built up in the reactor.

In accordance with the improved process, the freshly reduced metallic hydrogenating catalyst is maintained at a high level of activity throughout the operation. This results in greatly restricting the accumulation of waxy deposits on the particles of contact material, whereby long operating runs are made possible, and in the production of a highly saturated liquid product containing little or no wax. The freshly reduced metallic hydrogenating catalyst is maintained at a high level of activity by avoiding contact of the catalyst with the reactants for any substantial length of time under reaction conditions which build up deposits, such as wax, on the particles of contact material. Preferably, the temperature at which the reactants and contact material are contacted is not permitted to fall below 350° F. at any point in the reactor. This control of the temperature level is facilitated in the improved process by the employment of the contact material in the fluidized form described above. It is a characteristic of such a fluidized mass of contact material that all parts thereof are maintained substantially at a uniform temperature as a result of the high rate of heat exchange between the rapidly circulating particles.

The highly uniform temperature conditions which exist in a fluidized mass of contact material of the character described above make possible the use of the hydrogenating catalyst at its highest level of activity. This characteristic of the fluidized mass of contact material permits the withdrawal of heat therefrom at whatever rate is necessary to abstract the heat of reaction. The high rate of circulation of the particles of the contact mass serves to promote rapid and efficient heat exchange between that part of the fluidized mass which is subject to cooling means and the remainder thereof, and also serves to prevent the occurrence of local zones of overheating.

In accordance with the present invention, the catalyst is maintained at all times at its maximum level of activity and the reactants are passed at all times through the reaction zone at a temperature which produces hydrocarbons at a high rate. Furthermore, the temperature control provided by the fluidized contact mass permits the passage of the reactants through the reaction zone at a space velocity far in excess of the space velocity permissible in previous commercial or proposed operations. For example, it is permissible and even desirable to pass the reactants through a fluidized mass of contact material comprising cobalt as the catalyst at a space velocity equivalent to 2 or more liters (measured at standard conditions of pressure and temperature) of hydrogen and carbon monoxide in the 2:1 ratio per hour per gram of cobalt. In this operation, this rate is equivalent to about 500 standard volumes per hour per volume of catalyst dense phase. It is preferable, furthermore, that the contact material and reactants shall not be contacted at a temperature lower than 350° F. However, it is permissible, and in some instances necessary, to contact the reactants and fluidized catalyst mass for a short time at a temperature lower than 350° F., such as during the initial starting-up or aerating procedure, or after regeneration of used catalyst; but the quantity of carbon monoxide passed through the contact mass at such low temperature operations should be less than an amount equivalent to 15 parts by weight of carbon monoxide per part by weight of reduced metal of the catalyst.

In order to heat up the reaction system and to properly fluidize the finely-divided freshly reduced catalyst during the starting up of the system, the catalyst is contacted with an upward flowing hyrogen-containing gas, such as pure hydrogen or a gas containing a high percentage of hydrogen, such as recycle gas, at a temperature of contact between catalyst and gases not greater than about 350° F. After the initial contact between catalyst and gas below 350° F., the temperature of contact is raised to the desired operating temperature. The initial temperature of contact between finely-divided catalyst and hydrogen-containing gas during the starting up procedure is made at a temperature above about 200° F., for example at 300° F. This initial temperature is achieved by various methods, such as by heating the catalyst, or the gas, or the gas and catalyst to a sufficiently high temperature so that upon initial contact between gas and catalyst, the temperature of contact will be between about 200 and about 350° F. Heat may be supplied indirectly to the reaction zone itself, such as by circulating a heating fluid at a relatively high temperature through the cooling coils within the reaction zone or through a cooling jacket surrounding the reaction zone. After the initial contact, the temperature of the reaction zone is raised to the initial reaction temperature for the conversion of the synthesis feed gas to normally liquid organic compounds, for example, to 400° F. The temperature of the reaction zone may be raised to the desired operating temperature by adding additional hot catalyst at a temperature and in a quantity sufficient for this purpose, or by preheating the hydrogen-containing gas used to fluidize the catalyst to a still higher temperature necessary for this purpose, or both of the above methods may be used in combination to heat the reaction zone. Additionally or alternatively, the operating temperature may be achieved by indirect heating of the reaction zone in the manner previously described.

Preferably, the contact mass of finely-divided catalyst is fluidized and heated to a temperature of 350° F. or higher prior to contact thereof with the synthesis gas containing carbon monoxide. However, since the contact between catalyst and synthesis gas causes an exothermic reaction liberating a considerable amount of heat, the use of synthesis gas itself as the fluidizing gas in the starting-up procedure is a convenient and practical method for heating up the catalyst mass to the operating temperature for the production of the desired products of the process. In so doing, the contact between the carbon monoxide and catalyst during the starting-up or fluidization procedure should be maintained less than about 15 parts by weight of carbon monoxide per part by weight of the reduced metal of the catalyst. The heat necessary to raise the temperature of the contact mass to the desired operating temperature is obtained by the exothermic reaction of hydrogen with carbon monoxide. Under substantially adiabatic conditions between about 9 and about 12 pounds of carbon monoxide (using a 2:1 $H_2$:CO gas) is sufficient to raise each pound of catalyst mass from 300° F. to about 400° F., about 4 to 6 pounds of carbon monoxide being required to raise the temperature from 300° F. to about 360° F.

The initial fluidization of the catalyst does not correspond to conventional pretreatment or soaking period practiced in fixed-bed synthesis operations. The primary purpose of the present recommended operations is to assure proper fluidization of the finely-divided catalyst and to preheat the catalyst mass prior to the main operating run without excessive formation of wax upon the catalyst during this starting up period.

After use, the catalyst becomes deactivated as the result of such factors as oxidation of the reduced metal and/or accumulation of waxes, relatively heavy organic compounds, and carbon on the catalyst. The used or spent catalyst may be reactivated by a hydrogen treatment at a temperature substantially above the synthesis operating temperature, such as a temperature between about 550 and about 850° F. The catalyst may also be subjected to an oxidation treatment to burn up combustible materials prior to the reduction treatment. After reduction, the catalyst temperature is reduced to a temperature substantially below the predetermined operating temperature, preferably to a temperature not higher than 350° F., and the procedure outlined with regard to the starting-up of the process is followed.

With any freshly reduced or hydrogen treated catalyst the temperature is reduced after the hydrogen treatment to a temperature not higher than 350° F. and then gradually raised at a rate of about 2 to about 30° F. per hour to the predetermined operating temperature, such as 400° F. or higher. This applies equally to the initial starting-up procedure and to the procedure after regeneration of a used catalyst.

The invention will be described further by reference to the accompanying drawing which is a view in elevation, partly in section, of a relatively small reactor employed in connection with the improved process, and by reference to specific examples of operations embodying the present invention and carried out in the apparatus of the drawing.

Referring to the drawing, reactor 1 consists of a length of extra heavy 2-inch steel pipe which is 153 inches long and has inside and outside diameters of 1.94 inches and 2.38 inches respectively. Reactor 1 is connected by a conical section 2 to an inlet pipe 3 made of extra heavy half-inch steel pipe having an inside diameter of 0.55 inch. Reactor 1 is connected at the top, by means of conical section 4, with an enlarged conduit 5 comprising a length of 6-inch extra heavy steel pipe having an inside diameter of 5.76 inches. Conical section 4 and conduit 5 constitute an enlarged extension of reactor 2 which facilitates disengagement of catalyst from the gas stream after passage of the latter through the dense catalyst phase.

Conduit 5 is connected by means of manifold 6 with conduits 7 and 8 which comprise other sections of extra heavy 6-inch steel pipe. Conduits 7 and 8 contain filters 9 and 10 which are constructed of porous material which is permeable to the gas and vapors emerging from the reaction zone but impermeable to the catalyst particles carried by entrainment in the gas stream. Filters 9 and 10 are cylindrical in shape and closed at the bottom ends. They are dimensioned in relation to conduits 7 and 8 to provide a substantial annular space between the filter and the inner wall of the enclosing conduit for the passage of gases and vapors and entrained catalyst upwardly about the outer surface of the filter. The upper ends of filters 9 and 10 are mounted in closure means 11 and 12 in a manner whereby the gases and vapors must pass through either filter 9 or filter 10 to reach exit pipes 13 and 14. Each of filters 9 and 10 is approximately 36 inches long and 4½ inches in outside diameter, the filter walls being approximately ¾ of an inch thick.

The greater part of reactor 1 is enclosed in a jacket 15, which extends from a point near the top of the reactor to a point sufficiently low to enclose the 3-inch length of conical section 2 and approximately 5 inches of pipe 3. Jacket 15 comprises a length of extra heavy 4-inch steel pipe having an inside diameter of 3.83 inches. The ends of jacket 15 are formed by closing the ends of the 4-inch pipe in any suitable manner, as shown. Access to the interior of jacket 15 is provided by an opening 16 in the top thereof through a 2-inch steel pipe. Jacket 15 is adapted to contain a body of liquid for temperature control purposes, such as water, or "Dowtherm." The vapors which are evolved by the heat of reaction are withdrawn at 16, condensed, and returned through 16 to the body of temperature control fluid in jacket 15. The temperature control fluid in jacket 15 is maintained under a pressure at which the liquid boils at the temperature desired in jacket 15. Heating means, not shown, are provided in connection with jacket 15 to heat the temperature control fluid therein to any desired temperature.

In order to show all the essential parts of the reactor and associated catalyst separation means on a single sheet, a large proportion of the apparatus has been eliminated by the breaks at 17 and 18. For a clear understanding of the relative proportions of the apparatus, reference may be had to the over-all length of the apparatus, from the bottom of jacket 15 to exit pipes 13 and 14, which is 224 inches. In each of breaks 17 and 18 the portion of the apparatus eliminated is identical with that portion shown immediately above and below each break.

In the operations carried out in the apparatus of the drawing the catalyst recovery means, comprising filters 9 and 10, are effective to separate substantially completely entrained catalyst from the outgoing stream of gases and vapors. The disengagement of solids from the gas stream is promoted by the lowered velocity of the gas stream in conduit 5 and remaining solids are separated on the outer surfaces of filters 9 and 10. The latter are employed alternatively during the operation so that the stream of gases and vapors and entrained solids passes from conduit 5 through either the left or right branches of manifold 6 into conduit 7 or conduit 8. During the alternate periods, the filter which is not in use is subjected to a back pressure of inert gas which is introduced at a rate sufficient to dislodge catalyst which has accumulated on the outer surface of the filter during the active period. Such "blow-back" gas and dislodged catalyst flows downwardly in the conduit enclosing the filter and into manifold 6, in which the "blow-back" gas is combined with the reaction mixture flowing upwardly from conduit 5. The greater part of the catalyst thus dislodged settles downwardly into the reactor and is thus returned for further use.

In the operation of the apparatus of the drawing the desired quantity of powdered catalyst is introduced directly into the reactor through a suitable connection, not shown, in conduit 5. After any desired preliminary activation treatment, the temperature of the fluid in jacket 15 is adjusted, by the heating means mentioned above and by the pressure control means, to the temperature desired to be maintained in jacket 15 during the reaction. After the catalyst mass has reached the reaction temperature, the introduction of the reaction mixture through pipe 3 is initiated. The reaction mixture may be preheated approximately to the reaction temperature prior to its introduction through pipe 3 or the reactants may be heated to the reaction temperature through the passage thereof through that portion of pipe 3 which is enclosed by jacket 15 and by contact with the hot catalyst. It will be understood, furthermore, that the enclosure of pipe 3 in jacket 15 is not necessary to the invention and that the reactants may be heated to the reaction temperature solely by contact with the hot catalyst.

Pipe 3 is dimensioned with respect to reactor 1 and the desired superficial velocity whereby the velocity of the gases passing through pipe 3 is sufficiently high to prevent the passage of solids downwardly into pipe 3 against the incoming gas stream. A ball check valve, not shown, is provided in pipe 3 to prevent solids from passing downwardly out of the reactor when the gas stream is not being introduced into pipe 3.

The recovery system used for the apparatus shown and the example hereinafter consisted of a steam jacketed primary receiver and a secondary receiver preceded by a tap water condenser. The primary receiver was maintained at a temperature of about 300° F. and the secondary receiver was maintained at a temperature around 70° F. Effluent gas from the secondary receiver passed through a bed of activated carbon to remove light hydrocarbons from the gas before venting or recycling, as desired. The absorber was periodically stripped to recover absorbed material.

In this apparatus operating runs were made to test the efficacy of the starting-up procedure and the regeneration or reactivation of the catalyst by observing the results for various operating conditions during stabilized periods of operation. The conditions of operation and results, together with substantially complete explanation of the preparation and activation of the catalyst, the starting-up procedure, and regeneration of used catalyst are described below in the following representative examples.

The results and operating conditions of this invention are presented in Example II in conventional tabular form. The contraction, yield of oil and water may be taken as indications of the catalyst activity, resulting at least partially from the technique recommended. The inspections of the products were obtained by conventional methods of analysis. The unsaturated content of the oil is calculated and reported as "mol per cent mono-olefins," although there may be some di-olefins present.

EXAMPLE I

A catalyst was prepared in accordance with the following procedure:

A cobalt nitrate solution was prepared by dissolving 10,000 grams of $Co(NO_3)_2.6H_2O$ in 50 liters of water. A sodium carbonate solution was prepared by dissolving 6,100 grams of $Na_2CO_3.H_2O$ in 50 liters of water. With both solutions at the boiling point, the cobalt nitrate solution was added with stirring to the sodium carbonate solution. After thorough stirring, 4,000 grams of dried "Super-Filtrol" preheated to 180–200° F. were added with vigorous stirring. The slurry thus obtained was filtered and the filter cake was reslurried in 30 gallons of treated water. After standing for several hours, the slurry thus obtained was heated to boiling with vigorous stirring, after which the slurry was filtered again. During this operation, the filter cake was washed with 300 gallons of hot treated water. The filter cake thus obtained had a water content of approximately 70 weight per cent. This material was partially dried at room temperature to a water content of approximately 57% and was then extruded through a ⅜ inch diameter orifice. The extruded material was heated overnight in an oven at 420° F. The material thus obtained was in the form of hard lumps and had a water content of approximately 7.6 weight per cent. This material was then ground in a Braun disc mill and screened to collect material passing through a 40 mesh sieve. Material which did not pass the sieve was recycled to reduce the batch to a size smaller than 40 mesh.

The following Table I is a screen analysis of this powder:

*Table I*

| Size range | Weight percent |
|---|---|
| 40+ | Trace |
| 40/60 | 5.0 |
| 60/80 | 6.9 |
| 80/100 | 4.0 |
| 100/120 | 1.0 |
| 120/140 | 9.4 |
| 140/200 | 12.9 |
| 200/pan | 60.8 |

6.3 pounds of this material were charged to reactor 1, this amount being chosen to produce 5.8 pounds of catalyst in the reactor after reduction. The unit was flushed out with nitrogen and then hydrogen was passed in through pipe 3. Jacket 15 was filled with a suitable temperature control fluid such as "Dowtherm" and by heating this fluid in the manner described above the temperature of the catalyst mass was gradually raised. After the temperature of the catalyst was raised to 400° F. the rate of introduction of hydrogen was increased to 40 cubic feet per hour and the temperature was raised, while operating at that velocity, to 700° F. This operation was continued until the formation of water ceased, after which the hydrogen flow rate was lowered to 5 cubic feet per hour and the temperature was lowered to 300° F. The catalyst composition was Co:2 "Super-Filtrol."

The "Dowtherm" was then removed from jacket 15 and replaced with water at a temperature equivalent to a catalyst temperature of 300° F. The introduction of feed gas, consisting approximately of two parts of hydrogen and one part of carbon monoxide, was then initiated at a space velocity of 333 standard volumes of gas per hour per volume of dense catalyst phase, and the temperature was raised rapidly to the desired reaction temperature range. The time during which the temperature was raised from the initial temperature of 300° F. to 360° F. was only two hours. During this two hour period 4.3 pounds of carbon monoxide per pound of cobalt were present. Thereafter, the temperature was raised to 400° F. in a space of 14 hours.

The operation thereafter was continued under various experimental conditions for 1,115 hours at the end of which time the unit was shut down voluntarily and the catalyst withdrawn for examination. During this time the temperature of the reaction zone varied from a minimum of 380° F. to a maximum of 460° F. and the pressure varied from atmospheric to 50 pounds per square inch (gauge). The feed gas consisted substantially of $H_2$ and CO in ratios of 2:1 to 3:1 through this period and it was charged to the reactor at space velocities varying from 175 to 1200 volumes (measured at standard conditions of temperature and pressure) per volume of the dense catalyst phase per hour. Throughout this period the conversion rate was maintained at a high level to form a liquid product which was highly paraffinic but on the other hand substantially free from wax. During the period, however, the accumulation of deposits on the surfaces of the contact material was infinitesimal compared to the accumulation of wax which would have been formed on a comparable catalyst in a fixed bed operation. The finely-divided contact material remained perfectly dry and non-adherent throughout the operation and the fluidized condition of the contact material was maintained without difficulty.

The results obtained during one period in the above operation may be referred to to illustrate the character of the product obtained. In this period, of 66 hours' duration, after 423 hours of operation, a gas consisting essentially of $H_2$ and CO in the 2:1 ratio was passed through the reactor at a space velocity of 800–1200 volumes per volume of dense catalyst phase per hour. This corresponded to superficial inlet velocities of 0.43–0.73 foot per second. The dense phase rose to a level of 5.1–5.8 feet above pipe 3. The reaction was maintained at an average temperature of 430° F. and an exit pressure of 45 pounds per square inch (gauge) was maintained on the reactor. Under these conditions, a contraction of 41% was observed. A liquid yield (including propane and heavier hydrocarbons) of 76 cc. per cubic meter of charge gas was obtained. This included 33 cc. per cubic meter of normally liquid hydrocarbons boiling up to 300° F. and 24 cc. per cubic meter of hydrocarbons boiling above 300° F. This high boiling product constituted an excellent diesel fuel. The diesel oil product boiled between 330° F. and 668° F. It had an API gravity of 54.8 and an aniline point of 186° F., a pour point of 30° F. and a diesel index of 102. The diesel oil contained 2% olefins and 1.7 weight per cent of wax of a melting point of 124° F. The gasoline fraction contained 11% olefins and had an octane number of 42.7 A. S. T. M. This was raised to 67.5 by the addition of 3 cc. of tetraethyl lead per gallon.

The results obtained in this example differ substantially from the results obtained in previous fixed bed operations, in the production of a highly saturated liquid product while at the same time substantially suppressing the formation of wax.

EXAMPLE II

A catalyst for promoting the reaction of carbon monoxide with hydrogen was prepared as follows: 10,000 grams of cobalt nitrate, $$Co(NO_3)_2.6H_2O$$

and 1910 grams of magnesium nitrate, $$Mg(NO_3)_2.6H_2O$$

were dissolved in 50 liters of treated water. 6100 grams of sodium carbonate, $Na_2CO_3.H_2O$, were dissolved in 50 liters of treated water. Both solutions were heated to the boiling point and the nitrate solution was then added to the carbonate solution with continuous stirring. After the resulting mixture had been stirred thoroughly 4,000 grams of "Super-Filtrol" (previously dried at 900° F. for 1.5 hours) at a temperature of 210° F. were added to the solution with vigorous stirring. After thorough stirring, the resulting mixture was then filtered under a pressure of 30 pounds per square inch gage. The filter cake was washed in the filter with 160 gallons of treated water at 180° F. and a pressure of 40 pounds per square inch gage. The washed filter cake was dried overnight at room temperature by means of a blower. The partially dried material was dried at 210° F. to a moisture content of about 54% and was then extruded through ⅜ inch dies. The extruded material was then dried overnight at 210° F. to obtain a product having a moisture content of about 16%. This material was then ground to produce a granular mass finer than 6 mesh but coarser than 20 mesh. The granular material thus produced was reduced in an oven by means of a circulating stream of hydrogen from which water and $CO_2$ were removed constantly by means of a caustic wash and an alumina treatment. The temperature of the mass of catalyst during this operation was raised from about 100° F. to a final temperature of about 700° F. during which time the production of water ceased.

The following Table II is the reduction procedure of the fresh catalyst:

*Table II*

| Time | Temperature—° F. | | Outlet press., p. s. i. g. | $H_2$ (cu. ft.) consumption | $H_2O$ prod., cc. |
|---|---|---|---|---|---|
| | Inlet gas | Catalyst | | | |
| 1:00 | ($N_2$ purge at atmospheric conditions) | | | | |
| 1:15 | 150 | 110 | 11.5 | | |
| 1:45 | 350 | 325 | 11.3 | 6 | 55 |
| 2:15 | 485 | 455 | 10.8 | 8 | 95 |
| 2:45 | 610 | 595 | 10.0 | 14 | 175 |
| 3:15 | 630 | 640 | 10.0 | 16 | 130 |
| 3:45 | 628 | 635 | 10.0 | 6 | 0 |
| 4:15 | 670 | 695 | 9.5 | 14 | 0 |
| 4:45 | 665 | 700 | 9.5 | 10 | 0 |

The reduced catalyst was then ground at room temperature in an atmosphere of $CO_2$ to a powder of the desired size. The following Table III is a screen analysis of this powder:

*Table III*

| Size range | Weight percent |
|---|---|
| 40+ | 0.0 |
| 40/60 | 45.2 |
| 60/80 | 22.8 |
| 80/100 | 6.7 |
| 100/120 | 4.8 |
| 120/140 | 4.3 |
| 140/200 | 5.7 |
| 200/pan | 10.5 |

This catalyst had the following approximate composition in parts by weight: Co:0.15; MgO:2.0 "Super-Filtrol."

Reactor 1 was purged by means of $CO_2$ and, while a small stream of $CO_2$ was passed through the reactor, 9 pounds of the catalyst prepared as described above were introduced while maintained in an atmosphere of $CO_2$, passing $CO_2$ through the reactor at a velocity of about 0.1 foot per second. The catalyst mass was then gradually heated to 400° F. by heating the water bath in jacket 15 in the following manner. When the catalyst temperature reached 300° F. a stream of hydrogen was substituted for $CO_2$ as the aerating medium and was passed therethrough at a linear velocity of about 0.2 foot per second. When the catalyst temperature reached approximately 360° F. the stream of hydrogen was stopped and the passage of feed gas through the reactor was initiated. The reaction temperature was raised from 360° F. to 400° F. during a period of 11 hours. This operation was continued for approximately 650 hours during which time the gas was passed through the reactor at varying experimental conditions. The reaction temperature varied from about 380° F. to about 425° F. The pressure varied from atmospheric to about 50 pounds (gauge) per square inch. The feed gas, which consisted substantially entirely of $H_2$ and CO in ratios of about 2:1 to about 3:1 was charged to the reactor at space velocities of about 330 to about 875 volumes of gas (measured at standard conditions of temperature and pressure) per volume of dense catalyst phase per hour. A high rate of conversion to liquid hydrocarbon products was maintained throughout the operation, which was terminated arbitrarily in order to examine the catalyst. After 516 hours of this operation the catalyst was revivified by treatment with a stream of hydrogen at about 700–850° F. for about 5 or 6 hours. The function of this regeneration treatment was primarily the reduction of oxides formed on the catalyst surface during the operation, but the removal of any waxy deposits was also accomplished by the treatment. At no time during the operation was there absorbed any accumulation of deposits on the contact material which interfered with the fluidized condition of the catalyst and the final examination of the catalyst after the termination of the operation showed it to be a finely divided non-adherent, easily fluidizable material. The liquid product obtained throughout this operation was highly paraffinic in character, but the production of wax was very small. The following Tables IV and V show the operating conditions and results from the runs made of this catalyst:

Table IV

|  | A | B | C | D | E | F | G | H | I | J | K | L |
|---|---|---|---|---|---|---|---|---|---|---|---|---|
| Hours on condition | 22 | 12 | 18 | 24 | 24 | 24 | 36 | 18 | 6 | 6 | 12 | 8 |
| Total operating hours | 93 | 159 | 246 | 324 | 348 | 384 | 468 | 486 | 580 | 612 | 642 | 650 |
| Operating conditions: | | | | | | | | | | | | |
| Catalyst temperature, average, °F | 400 | 402 | 381 | 410 | 412 | 411 | 424 | 426 | 396 | 412 | 414 | 414 |
| Feed gas temperature, °F | 77 | 217 | 366 | 402 | 408 | 395 | 391 | 390 | 388 | 397 | 399 | 402 |
| Reactor outlet pressure, p.s.i.g | 24.3 | 44.0 | 2 | 44 | 43 | 44 | 43 | 43 | 45 | 44 | 44 | 45 |
| Fluid bed conditions: | | | | | | | | | | | | |
| Bed height | 9.4 | 8.6 | 7.4 | 7.2 | 6.9 | 7.0 | 6.9 | 7.0 | 7.7 | 7.5 | 8.0 | 6.9 |
| Lb. catalyst in reactor | 8.6 | 8.0 | 6.7 | 6.7 | 6.7 | 6.7 | 6.7 | 6.7 | 8.3 | 8.1 | 8.1 | 8.1 |
| Catalyst density, lb./cu. ft | 45 | 46 | 45.3 | 46.5 | 49.1 | 48.4 | 48.2 | 47.5 | 53.3 | 54.5 | 52.0 | 58.5 |
| Cu. ft. of catalyst | 0.190 | 0.173 | .148 | .144 | .137 | .140 | .139 | .140 | 0.155 | 0.151 | 0.161 | 0.138 |
| Inlet velocity, ft./sec | 0.64 | 0.62 | 0.64 | 0.60 | 0.53 | 0.54 | 0.55 | 0.56 | 0.47 | 0.45 | 0.38 | 0.33 |
| Cu. ft. inlet gas/hr./cu. ft. catalyst | 476 | 685 | 331 | 877 | 787 | 793 | 784 | 777 | 599 | 613 | 491 | 444 |
| Liters of inlet gas/hr./gm. cobalt | 1.94 | 2.54 | 1.05 | 2.71 | 2.31 | 2.38 | 2.34 | 2.33 | 1.99 | 1.98 | 1.70 | 1.31 |
| Contact time, secs | 19 | 17 | 13 | 15 | 16 | 15 | 15 | 15 | 18 | 20 | 22 | 24 |
| Gas throughputs: | | | | | | | | | | | | |
| Gas entering catalyst bed, S.C.F./hr | 90.5 | 118.5 | 49.0 | 126.3 | 107.7 | 111.0 | 109.0 | 108.7 | 92.9 | 92.5 | 79.1 | 61.3 |
| Gas leaving catalyst bed, S.C.F./hr | 28.8 | 48.7 | 34.5 | 50.2 | 40.5 | 54.0 | 51.0 | 53.9 | 58.0 | 36.8 | 49.7 | 36.1 |
| Blowback gas to filter, S.C.F./hr | 12.4 | 13.8 | 8.8 | 16.0 | 15.2 | 17.3 | 17.1 | 19.2 | 18.7 | 8.4 | 21.7 | 20.6 |
| Gas entering fluid bed (air-free): | | | | | | | | | | | | |
| CO₂—dry basis, percent | 3.2 | 1.1 | 5.5 | 4.4 | 4.6 | 3.9 | 0.6 | 0.8 | 0.2 |  | 0.3 | 0.3 |
| CO—dry basis, percent | 25.8 | 29.7 | 30.0 | 27.9 | 28.6 | 28.7 | 32.8 | 32.3 | 18.2 |  | 17.1 | 17.4 |
| H₂—dry basis, percent | 66.2 | 65.5 | 59.0 | 66.3 | 64.8 | 63.2 | 64.1 | 64.3 | 34.8 |  | 31.8 | 32.6 |
| CH₄—dry basis, percent | 4.8 | 3.7 | 4.9 | 1.0 | 2.0 | 3.7 | 2.3 | 2.0 | 0.7 |  | 1.3 | 1.1 |
| N₂—dry basis, percent |  |  | 0.6 | 0.4 |  | 0.5 | 0.2 | 0.6 | 46.1 |  | 49.5 | 48.6 |
| Molecular weight—dry gas | 10.7 | 10.7 | 12.9 | 11.3 | 11.6 | 11.7 | 11.2 | 11.2 | 18.9 |  | 19.6 | 19.4 |
| H₂:CO ratio | 2.6 | 2.2 | 2:1 | 2.4:1 | 2.3:1 | 2.2:1 | 2:1 | 2:1 | 1.9:1 |  | 1.9:1 | 1.9:1 |
| Results: | | | | | | | | | | | | |
| Yields— | | | | | | | | | | | | |
| Volume percent contraction | 69.7 | 60.4 | 31.0 | 61.8 | 64.0 | 52.6 | 54.6 | 52.0 | 71.5 | 61.5 | 75.4 | 80.7 |
| cc. oil/hr./gm. cobalt | 0.366 | 0.421 | 0.068 | 0.391 | 0.350 | 0.288 | 0.293 | 0.299 | 0.181 | 0.242 | 0.145 | 0.086 |
| Percent CO disappearing | 94.7 | 61.6 | 23.7 | 75.1 | 78.1 | 50.1 | 56.8 | 55.5 | 69.7 | 70.3 | 70.1 | 79.4 |
| Percent CO→CO₂ (basis inlet gas) | 1.9 | 0.4 | 1.5 | −3.5 |  | 3.5 | 1.5 | 1.2 | 9.0 | 9.1 | 7.5 | 2.5 |
| Percent CO→heavy oil | 33.0 | 31.8 | 4.7 | 22.5 | 23.4 | 22.4 | 18.9 | 18.7 | 27.0 | 23.4 | 19.8 | 24.3 |
| Percent CO→C₅ | 32.4 | 26.1 | 16.4 | 27.2 | 28.6 | 19.1 | 22.4 | 24.4 | 28.1 | 17.4 | 33.2 | 18.2 |
| Percent CO→CH₄ | 22.9 | 5.1 | −2.5 | 19.6 | 19.2 | 8.7 | 13.0 | 14.9 | 15.7 | 26.7 | 1.2 | 25.7 |
| Percent CO→unconverted | 5.3 | 38.4 | 76.3 | 24.9 | 21.9 | 49.9 | 43.2 | 44.5 | 30.3 | 29.7 | 29.9 | 20.6 |
| Percent CO unaccounted for | 4.5 | −1.8 | 3.6 | 9.3 | 6.9 | −3.6 | 1.0 | −3.7 | −10.1 | −6.3 | 8.4 | 8.7 |

Table V

|  | A | B | C | D | E | F | G | H | I | J | K | L |
|---|---|---|---|---|---|---|---|---|---|---|---|---|
| Products: | | | | | | | | | | | | |
| Total gm. H₂O | 9,791 | 5,987 | 1,667 | 11,646 | 11,266 | 10,429 | 17,008 | 7,488 | 1,409 | 2,161 | 2,466 | 1,592 |
| Total gm. heavy oil | 2,841 | 2,253 | 208 | 3,186 | 2,903 | 2,867 | 4,079 | 1,981 | 460 | 728 | 540 | 348 |
| Total cc. heavy oil | 3,791 | 3,005 | 277 | 4,215 | 3,854 | 3,936 | 5,626 | 2,729 | 622 | 999 | 734 | 472 |
| Total gm. C₅ | 2,844 | 1,886 | 734 | 3,946 | 3,629 | 2,506 | 4,961 | 2,642 | 490 | 569 | 922 | 252 |
| Total cc. oil | 8,235 | 5,952 | 1,424 | 10,381 | 9,524 | 7,852 | 13,378 | 6,857 | 1,388 | 1,888 | 2,175 | 866 |
| Gas leaving fluid bed (air-free): | | | | | | | | | | | | |
| Percent CO₂ | 11.5 | 3.0 | 8.5 | 8.7 | 12.3 | 10.1 | 2.3 | 2.4 | 2.9 | 8.4 | 2.4 | 1.2 |
| Percent CO | 4.2 | 27.7 | 32.7 | 17.5 | 16.6 | 29.6 | 30.2 | 29.0 | 8.8 | 25.0 | 8.1 | 6.1 |
| Percent H₂ | 45.6 | 52.8 | 50.6 | 52.7 | 46.9 | 44.2 | 49.9 | 50.4 | 7.3 | 39.3 | 6.8 | 0.0 |
| Percent CH₄ | 33.4 | 12.7 | 5.9 | 16.3 | 19.8 | 12.8 | 14.0 | 13.8 | 5.6 | 24.3 | 2.3 | 9.5 |
| Percent C₂+heavier | 5.2 | 3.8 | 1.4 | 3.8 | 4.4 | 2.3 | 3.2 | 3.2 | 1.6 | 3.0 | 1.8 | 1.0 |
| Percent N₂ | 0.1 |  | 0.9 | 1.0 |  | 1.0 | 0.4 | 1.2 | 73.8 | 0.0 | 78.6 | 82.2 |
| Carbon No. | 1.54 | 1.92 | 1.77 | 1.75 | 1.73 | 1.61 | 1.74 | 1.75 | 1.89 | 1.44 | 2.76 | 1.38 |
| Molecular weight—Dry gas | 16.3 | 14.9 | 16.1 | 15.4 | 17.3 | 17.6 | 15.1 | 15.0 | 26.6 | 17.5 | 27.1 | 27.5 |
| Heavy oil inspections: | | | | | | | | | | | | |
| Gravity, °A.P.I | 64.0 | 60.0 | 57.2 | 62.0 | 63.8 | 61.1 | 61.8 | 61.9 | 59.9 | 62.7 | 60.6 | 60.6 |
| A.S.T.M. distillation— | | | | | | | | | | | | |
| I.B.P., °F | 134 | 152 | 218 | 183 | 152 | 176 |  | 167 | 166 | 160 | 180 | 186 |
| 5% | 184 | 205 | 267 | 228 | 179 | 216 | 209 | 206 | 221 | 200 | 220 | 230 |
| 10% | 208 | 229 | 289 | 240 | 207 | 232 | 225 | 221 | 240 | 210 | 244 | 248 |
| 20% | 232 | 264 | 319 | 264 | 238 | 261 | 251 | 252 | 272 | 247 | 270 | 268 |
| 30% | 257 | 298 | 346 | 288 | 263 | 279 | 274 | 277 | 301 | 274 | 298 | 290 |
| 40% | 281 | 332 | 381 | 310 | 284 | 312 | 297 | 298 | 331 | 301 | 319 | 318 |
| 50% | 311 | 372 | 400 | 338 | 317 | 340 | 327 | 328 | 363 | 329 | 342 | 342 |
| 60% | 341 | 415 | 432 | 368 | 344 | 373 | 356 | 366 | 405 | 368 | 370 | 371 |
| 70% | 379 | 470 | 467 | 407 | 383 | 415 | 398 | 404 | 446 | 406 | 409 | 406 |
| 80% | 430 | 527 | 508 | 459 | 436 | 468 | 449 | 458 | 497 | 457 | 459 | 454 |
| 90% | 490 | 602 | 572 | 532 | 509 | 543 | 532 | 550 | 554 | 507 | 548 | 536 |
| 95% | 554 | 646 | 622 | 590 | 584 | 610 | 608 | 619 | 594 | 555 | 604 | 602 |
| E.P. | 574 | 665 | 660 | 637 | 636 | 646 | 643 | 666 | 618 | 616 | 660 | 648 |
| Percent monoolefins | 0.8 | 6.9 | 3.3 | 2.6 | 3.2 | 5.4 | 7.1 | 6.8 | 4.5 | 4.2 | 4.3 | 4.2 |
| Molecular weight | 140 | 165 | 177 | 153 | 142 | 152 | 147 | 149 | 160 | 145 | 154 | 153 |
| Light naphtha from adsorber: | | | | | | | | | | | | |
| Inspections—gravity, °A.P.I | 79.8 | 81.9 |  | 85.6 | 85.3 | 84.3 |  | 83.7 |  |  | 82.9 |  |
| A.S.T.M. distillation— | | | | | | | | | | | | |
| I.B.P., °F | 107 | 97 |  | 90 | 78 | 96 |  | 92 |  |  | 92 |  |
| 5% | 127 | 112 |  | 100 | 93 | 110 |  | 109 |  |  | 105 |  |
| 10% | 132 | 118 |  | 104 | 98 | 116 |  | 113 |  |  | 110 |  |
| 20% | 142 | 128 |  | 111 | 106 | 121 |  | 118 |  |  | 119 |  |
| 30% | 151 | 137 |  | 117 | 116 | 126 |  | 124 |  |  | 129 |  |
| 40% | 161 | 147 |  | 124 | 124 | 131 |  | 130 |  |  | 139 |  |
| 50% | 171 | 158 |  | 132 | 138 | 139 |  | 137 |  |  | 151 |  |
| 60% | 183 | 172 |  | 142 | 153 | 146 |  | 147 |  |  | 165 |  |
| 70% | 198 | 187 |  | 156 | 175 | 158 |  | 159 |  |  | 182 |  |
| 80% | 221 | 207 |  | 176 | 201 | 174 |  | 176 |  |  | 203 |  |
| 90% | 244 | 235 |  | 208 | 238 | 206 |  | 206 |  |  | 232 |  |
| 95% | 268 | 255 |  | 242 | 295 | 239 |  | 244 |  |  | 259 |  |
| E.P. | 292 | 284 |  | 274 | 298 | 280 |  | 279 |  |  | 297 |  |
| Reid vapor pressure, p.s.i | 9.1 | 12.4 |  | 13.9 | 18.8 | 11.6 |  | 11.6 |  |  | 13.8 |  |
| Percent monoolefins | 2.0 | 12.2 |  | 14.8 | 11.2 | 15.9 |  | 18.2 |  |  | 14.6 |  |
| Desorbed oil yield, cc./m.³ inlet gas | 13.0 | 24.1 |  | 23.7 | 27.8 | 23.6 |  | 26.4 |  |  | 43 |  |
| Tail gas from adsorber—Cu.Ft./Hr | 29.2 | 29.6 |  | 55.2 | 43.4 | 53.8 |  | 53.0 |  |  | 50.5 |  |
| Analysis (air-free; dry): | | | | | | | | | | | | |
| Percent CO₂ | 16.1 | 5.1 |  | 9.8 | 10.9 | 6.3 |  | 6.3 |  |  | 1.2 |  |
| Percent CO | 0.0 | 23.8 |  | 23.4 | 20.0 | 24.8 |  | 17.2 |  |  | 6.8 |  |
| Percent H₂ | 41.4 | 48.2 |  | 54.9 | 53.4 | 50.6 |  | 53.0 |  |  | 4.0 |  |
| Percent CH₄ | 35.8 | 20.3 |  | 8.4 | 13.3 | 14.4 |  | 17.9 |  |  | 4.8 |  |
| Percent C₂'s | 1.9 | 0.8 |  | 0.8 | 1.1 | 1.0 |  | 0.8 |  |  | 0.3 |  |
| Percent C₃'s | 2.7 | 1.0 |  | 0.9 | 0.8 | 1.3 |  | 1.5 |  |  | 0.2 |  |
| Percent C₄'s | 1.1 | 0.3 |  | 0.5 | 0.5 | 1.0 |  | 1.0 |  |  | 0.5 |  |
| Percent C₅'s | 0.5 | 0.2 |  | 0.1 |  |  |  | 0.3 |  |  | 0.1 |  |
| Percent N₂ | 0.5 | 0.3 |  | 1.2 |  | 0.6 |  | 2.0 |  |  | 82.1 |  |

For an example of the character of the product obtained in this operation, reference may be had to the results obtained during a 22 hour period after 71 hours of operation (run A, Tables IV and V). In this period a gas consisting essentially of $H_2$ and CO in a 2.6:1 ratio was reacted at 405° F. An exit pressure of 25 pounds per square inch was maintained on the reactor and the feed gas was passed through the reactor at a space velocity of 476 volumes per hour per volume of fluidized catalyst. This corresponds to a superficial inlet velocity of 0.64 foot per second. The dense hydrogen and carbon monoxide was passed through the reactor. The temperature was then allowed to increase from a minimum of about 340° F. to a predetermined operating temperature at a rate of about 2° F. or greater per hour. In general, the return to operating conditions after regeneration was similar to the procedure for starting up the process. Table VI below is a tabular form of the operating conditions just prior to and subsequent to the regeneration of the catalyst, including also the regenerating procedure.

*Table VI*

| Time— Hrs. cumulative | Aver. cat. bed— Temp., °F. | Gas inlet— Temp., °F. | Outlet press., p. s. i. g. | Liquid product (cumulative) | | Inlet gas, C. F./hr. | Remarks |
| --- | --- | --- | --- | --- | --- | --- | --- |
| | | | | $H_2O$, cc. | Oil, cc. | | |
| 511 | 436 | 74 | 45 | | | 111 | $N_2$+syn. gas. |
| 512 | 437 | 74 | 45 | | | 116 | |
| 513 | 435 | 74 | 45 | | | 107 | |
| 514 | 434 | 74 | 45 | | | 103 | |
| 515 | 435 | 73 | 45 | | | 119 | |
| 516 | 434 | 72 | 45 | 1,595 | 210 | 113 | |
| 517 | 469 | .72 | 45 | | | 105 | Cut out $N_2$. |
| 518 | 215 | 72 | 45 | | | 109 | |
| 519 | 214 | 72 | 45 | 435 | 55 | 109 | Cut out syn. gas, $H_2$ in. |
| 520 | 341 | 72 | 0 | | | 14 | |
| 521 | 482 | 72 | 0 | | | 14 | |
| 522 | 647 | 71 | 0 | | | 40 | |
| 523 | 784 | 72 | 0 | | | 40 | |
| 524 | 826 | 74 | 0 | | | 40 | |
| 525 | 671 | 76 | 0 | | | 40 | |
| 526 | 556 | 76 | 0 | | | 40 | |
| "BOTTLED UP" OVERNIGHT | | | | | | | |
| 534 | 345 | 100 | 0 | 265 | 37 | | |
| 535 | 339 | 80 | 0 | | | | |
| 536 | 360 | 88 | 0 | | | 34 | |
| 537 | 347 | 85 | 0 | | | | Cut out $H_2$, in syn. gas. |
| 538 | 351 | 79 | 0 | | | 34 | |
| 539 | 350 | 88 | 0 | | | 28 | |
| 540 | 360 | 85 | 0 | | | 24 | |
| 541 | 367 | 81 | 0 | 300 | 100 | 27 | |
| 542 | 371 | 89 | 0 | | | 18 | |
| 543 | 370 | 84 | 0 | | | 25 | |
| 544 | 365 | 77 | 0 | | | 34 | |
| 545 | 366 | 80 | 0 | | | 37 | |
| 546 | 363 | 78 | 0 | | | 45 | |
| 547 | 363 | 76 | 0 | 565 | 170 | 45 | | phase rose to a level of 9.4 feet above pipe 3. During this period a contraction of 67.5% was observed and a liquid product consisting of propane and heavier hydrocarbons was obtained at the rate of 147 cc. per cubic meter of feed gas.

The liquid condensate obtained in this operation, boiling between 134° F. and 574° F., and including all the higher boiling products contained but 0.8 mol per cent olefins. No wax formation was detected.

In each of the foregoing examples the accumulation of material on the surface of the contact throughout the operation was less one weight per cent of the contact material. This included a waxy oil and carbon.

After 516 hours of operation, the flow of synthesis gas to the reactor was discontinued and approximately 14 standard cubic feet of hydrogen per hour was passed through the reactor. The reactor pressure was then reduced to atmospheric. The temperature of the reactor was raised above about 550° F. by heating the reactor with Dowtherm. At this point the flow of hydrogen was increased to about 40 standard cubic feet per hour and subsequently the reaction temperature was raised above about 700° F. After several hours of operation in this manner, the temperature of the reactor was reduced to 550° F. and at this point the flow of hydrogen was discontinued and the unit "bottled up." The temperature was then reduced still further to about 345° F. at which time synthesis gas comprising The results obtained in the foregoing examples, which are characteristic of the method of operation of this invention, are different from results obtained in previous operations principally in the formation of a highly paraffinic liquid product while substantially avoiding the formation of wax. It may be theorized that such results are obtained by initiating the main conversion of reaction of the $H_2$ and CO to liquid hydrocarbons at a high rate at the initial level of activity of the freshly reduced catalyst. As is pointed out above, this is made possible by maintaining the catalyst mass in the fluidized form which provides a means for withdrawing heat from the reaction at an unusually high rate. It may be postulated that when the freshly reduced catalyst is in its initial state of activity, the formation of wax occurs only at temperatures substantially below 350° F., and therefore the initial procedure after reduction of the catalyst is very important. Thus, by initiating the operation with a freshly reduced or regenerated catalyst in accordance with this invention the formation of wax is substantially inhibited from the beginning and the capacity of the catalyst for adsorbing hydrogen is not reduced by the accumulation of wax thereon. At the same time, the high activity of the catalyst for hydrogenation results in the formation of a highly saturated liquid product. It will be understood, however, that the foregoing is offered merely as a possible explanation and that the invention is not limited by such theoretical considerations.

The present invention provides a process in which the catalyst is maintained at a high level of activity during operating periods of long duration in which the reaction gas is passed through the reaction zone at space velocities substantially higher than those possible in previous fixed bed operations, employing a catalyst which has been preconditioned to a lower level of activity. This results in the formation of a maximum yield of liquid product and a minimum production of solid products such as wax. Such a liquid product contains a fraction which is a highly valuable diesel fuel because of its substantially completely paraffinic character, because it is composed substantially entirely of straight chain hydrocarbons, and because of the relatively low pour point resulting from the small amount of wax contained therein.

The foregoing examples indicate satisfactory starting-up procedure and operating conditions. In general, it may be said that any pressure from atmospheric to any feasible superatmospheric pressure may be employed. The temperatures should be maintained above 350° F. for the main operating run at substantially all times, and temperatures in the range of 390 to 550° F., preferably 400 to 500° F., are highly satisfactory to effect substantial conversion at high space velocities. At temperatures of 350 to 450° F. space velocities of 50 to 2000 standard volumes of reactants per hour per volume of fluidized dense phase are satisfactory; higher velocities being in general associated with higher temperatures. For catalysts comprising about one-third by weight of hydrogenating metal, the above range corresponds to about 0.2 to 8 standard liters per hour per gram of hydrogenating metal.

Various modifications and alterations of the present invention may become apparent to those skilled in the art without departing from the scope of this invention.

We claim:

1. In the catalytic hydrogenation of carbon monoxide for the production of hydrocarbons, oxygenated hydrocarbons and the like, the method which comprises passing carbon monoxide and hydrogen in contact with a solid particle, synthesis catalyst within a reaction zone, effecting said contact at a temperature within a predetermined range such that a substantial conversion of carbon monoxide into higher molecular weight compounds occurs, with some deposition of solidifiable material upon the catalyst particles, discontinuing the flow of carbon monoxide and hydrogen through said reaction zone, subjecting said catalyst to contact with hydrogen under regenerating conditions including an elevated temperature effective to strip the said solidifiable material from the catalyst, reducing the temperature of the resulting hydrogen treated catalyst to substantially below said predetermined temperature range, thereafter passing a mixture of carbon monoxide and hydrogen in contact with the resulting cooled catalyst while slowly raising the temperature of the catalyst, at the rate of about 2 to 30° F. per hour, to substantially said predetermined range to thereby condition the catalyst and thereafter continuing passage of said carbon monoxide and hydrogen in contact with the catalyst at about said predetermined range.

2. In the catalytic hydrogenation of carbon monoxide for the production of hydrocarbons, oxygenated hydrocarbons and the like, the method which comprises passing carbon monoxide and hydrogen in contact with a solid particle, synthesis catalyst within a reaction zone, effecting said contact at a temperature within a predetermined range such that a substantial conversion of carbon monoxide into higher molecular weight compounds occurs, with some deposition of solidifiable material upon the catalyst particles, discontinuing the flow of carbon monoxide and hydrogen through said reaction zone, subjecting said catalyst to contact with hydrogen under regenerating conditions including an elevated temperature effective to remove the said solidifiable material from the catalyst, reducing the temperature of the resulting hydrogen treated catalyst to substantially below said predetermined temperature range, thereafter passing a mixture of carbon monoxide and hydrogen in contact with the resulting cooled catalyst while raising the temperature of the catalyst, at the rate of about 2 to 30° F. per hour, to substantially said predetermined range to thereby condition the catalyst and thereafter continuing passage of said carbon monoxide and hydrogen in contact with the catalyst at about said predetermined range.

3. In the catalytic hydrogenation of carbon monoxide within a predetermined temperature range such that a substantial conversion of carbon monoxide into higher molecular weight compounds occurs, the method which comprises subjecting a solid particle, synthesis catalyst to contact with hydrogen at an elevated temperature not lower than said predetermined temperature range, reducing the temperature of the resulting hydrogen treated catalyst to substantially below said predetermined temperature range, thereafter passing a mixture of carbon monoxide and hydrogen in contact with the resulting cooled catalyst while raising the temperature of the catalyst at the rate of about 2 to 30° F. per hour to substantially said predetermined temperature range to thereby condition the catalyst, and thereafter continuing the passage of said carbon monoxide and hydrogen in contact with the catalyst at a temperature within said predetermined temperature range such that a substantial conversion of carbon monoxide into higher molecular weight compounds occurs with some deposition of solidifiable material upon the catalyst particles.

4. In the catalytic hydrogenation of carbon monoxide for the production of hydrocarbons, oxygenated hydrocarbons and the like, the method which comprises passing carbon monoxide and hydrogen in contact with a solid particle, cobalt synthesis catalyst within a reaction zone, effecting said contact within a predetermined temperature range between about 390° F. and 450° F. such that a substantial conversion of carbon monoxide into higher molecular weight compounds occurs with some deposition of solidifiable material upon the catalyst particles, discontinuing the flow of carbon monoxide and hydrogen through said reaction zone, subjecting said catalyst to contact with hydrogen under regenerating conditions including an elevated temperature effective to strip said solidifiable material from the catalyst, reducing the temperature of the resulting hydrogen treated catalyst to substantially below said predetermined temperature range, thereafter passing a mixture of carbon monoxide and hydrogen in contact with the resulting cooled catalyst while slowly raising the temperature of the catalyst, at the rate of about 2° F. to 30° F. per hour, to substantially said predetermined temperature range to thereby condition the catalyst and thereafter continuing passage of said carbon monoxide and hydrogen in contact with the catalyst at about said predetermined temperature range.

5. In the catalytic hydrogenation of carbon monoxide with a finely divided catalyst suspended in the gaseous reaction mixture in the reaction zone within a predetermined temperature range such that a susbtantial conversion of carbon monoxide into higher molecular weight compounds occurs, the method which comprises subjecting a solid particle, synthesis catalyst to contact with hydrogen while suspended therein at an elevated temperature not lower than said predetermined temperature range, reducing the temperature of the resulting hydrogen treated catalyst to substantially below said predetermined temperature range, thereafter passing a mixture of carbon monoxide and hydrogen in contact with the resulting cooled catalyst while the catalyst is suspended in said mixture of carbon monoxide and hydrogen and while raising the temperature of the catalyst, at the rate of about 2° F. to 30° F. per hour, to substantially said predetermined temperature range to thereby condition the catalyst and thereafter continuing passage of said carbon monoxide and hydrogen in contact with the catalyst at a temperature within said predetermined temperature range such that a substantial conversion of carbon monoxide into higher molecular weight compounds occurs with some deposition of solidifiable material upon the catalyst particles.

6. The process of claim 5 in which said synthesis catalyst comprises cobalt and said predetermined temperature range is between about 390° F. and about 450° F.

LOUIS C. RUBIN.
HENRY G. McGRATH.

REFERENCES CITED

The following references are of record in the file of this patent:

UNITED STATES PATENTS

| Number | Name | Date |
|---|---|---|
| 1,984,380 | Odell | Dec. 18, 1934 |
| 2,257,457 | Fischer et al. | Sept. 30, 1941 |
| 2,274,639 | Scheurmann et al. | Mar. 3, 1942 |
| 2,445,795 | Millendorf | July 27, 1948 |
| 2,445,796 | Millendorf | July 27, 1948 |